United States Patent [19]

Rapoza et al.

[11] 3,861,800
[45] Jan. 21, 1975

[54] PARTICLE COUNTER INDEPENDENT OF FLOW RATE

[75] Inventors: Edward J. Rapoza, Butler, N.J.;
Keith Watson, Del Mar, Calif.

[73] Assignee: Becton, Dickinson and Company,
East Rutherford, N.J.

[22] Filed: July 27, 1972

[21] Appl. No.: 275,864

[52] U.S. Cl. ............... 356/39, 356/103, 324/71 CP
[51] Int. Cl. ........................................... G01n 31/16
[58] Field of Search ............ 324/71 CP; 356/39, 40, 356/41, 180, 181, 102, 103

[56] References Cited
UNITED STATES PATENTS

| | | | |
|---|---|---|---|
| 2,719,287 | 9/1955 | Bartlett | 324/71 CP |
| 2,775,159 | 12/1956 | Frommer | 356/103 |
| 3,231,815 | 1/1966 | Spencer | 324/71 CP |
| 3,275,834 | 9/1966 | Stevens | 356/102 |
| 3,661,460 | 5/1972 | Elking et al. | 356/102 |
| 3,733,548 | 5/1973 | Coulter et al. | 324/71 CP |

OTHER PUBLICATIONS
"Frequency and Time Measuring Instrumentation;" Hewlett-Packard Catalogue 1967.

*Primary Examiner*—Ronald L. Wibert
*Assistant Examiner*—Conrad Clark
*Attorney, Agent, or Firm*—Kane, Dalsimer, Kane, Sullivan and Kurucz

[57] ABSTRACT

A vacuum pump and a pressure regulator are connected to a liquid trap for developing a predetermined vacuum within the trap. An electrode housing has a cavity formed therein, which is divided into first and second chambers by a partition having an aperture connecting said first and second chambers. An electrode is mounted in each of said first and second chambers. Said second chamber is in communication with the liquid trap and said first chamber has a tube extending downwardly into a sample of fluid having dispersed particles contained in a container so that the fluid sample is drawn from the container into said first chamber through the aperture to said second chamber and thereafter into the liquid trap.

An AC electrical signal is imposed upon the electrodes to develop a voltage across the fluid sample passing through the aperture. The AC signal is modulated by the conductivity of the fluid sample instantaneously passing through the aperture so that when a high impedance particle passes through the aperture, the AC signal intensity increases in relationship to the AC signal intensity when fluid is passing through the aperture. The signal modulation is detected in a manner well known in the art to provide pulses corresponding to the particles passing through the aperture. Means are provided for accumulating the pulses during a precisely repeatable count period and for providing a readout indicating the number of particles contained in a unit volume of the fluid sample, without the requirement of measuring sample volume.

3 Claims, 8 Drawing Figures

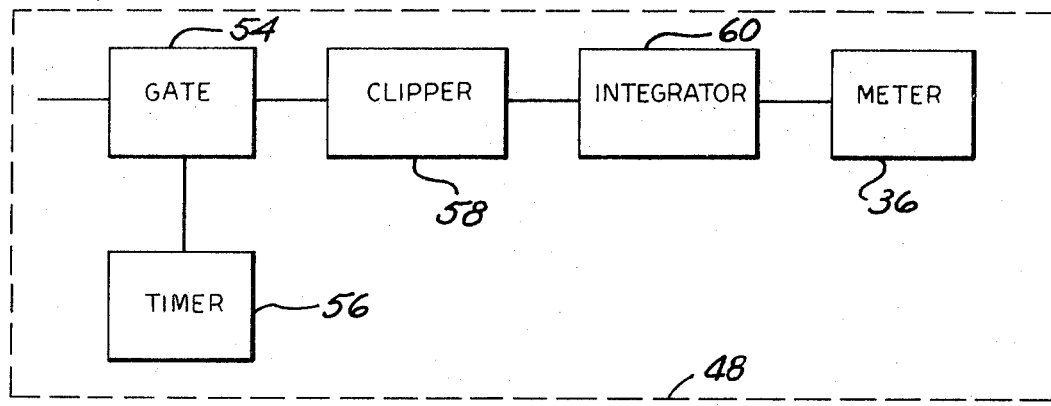
Fig. 4
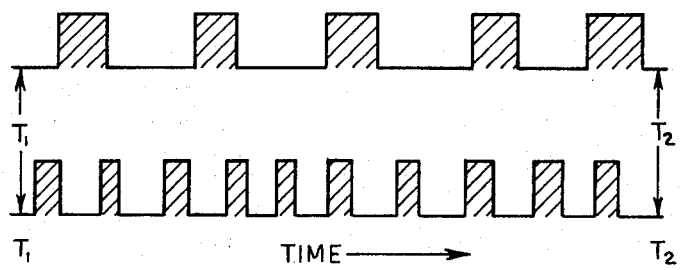
Fig. 5A
Fig. 5B
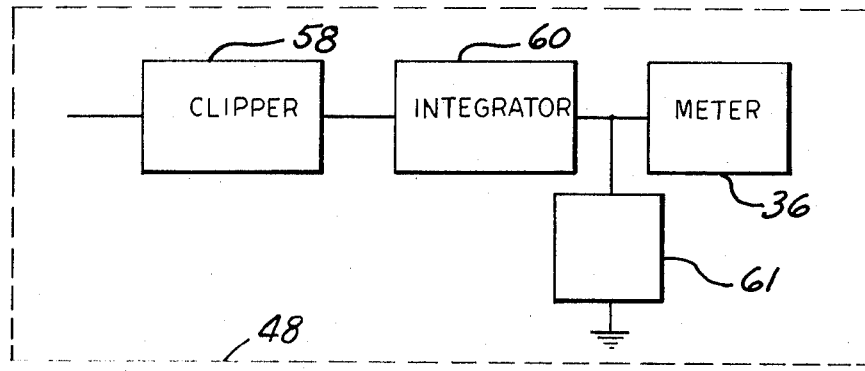
Fig. 6
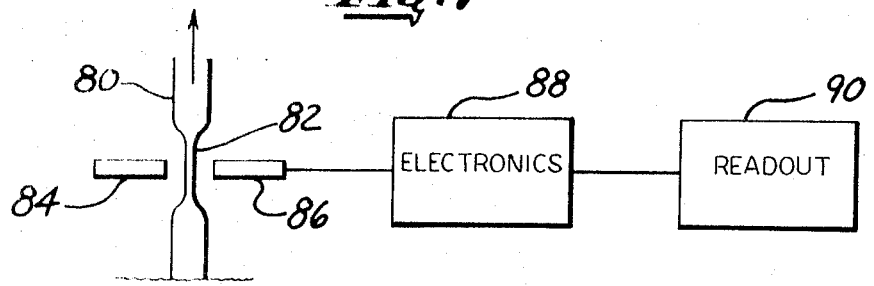
Fig. 7

PARTICLE COUNTER INDEPENDENT OF FLOW RATE

BACKGROUND OF THE INVENTION

1. Field of the Invention

The present invention relates to particle counters and more particularly to counters that do not require volume measurement and may be used for counting blood cells.

2. Description of the Prior Art

Heretofore, blood cell counting was accomplished in three distinctly different ways. Firstly, a sample of diluted blood was placed in a counting chamber under a microscope and the blood cells were individually counted to determine the blood cell count. Secondly, a more sophisticated blood cell counting system utilized optics and photoelectric cells to provide a count of the number of blood cells passing through a light beam. Thirdly, pure electronic blood cell counters were utilized wherein changes in conductivity of a diluted blood sample were sensed to provide an output corresponding to the number of blood cells in a sample of known volume.

One type of pure electronic blood cell counter was developed wherein a known volume of diluted blood was drawn through an aperture and a DC electric signal was applied to electrodes positioned at each side of the aperture to develop a voltage corresponding to the instantaneous conductivity of the blood sample passing through the aperture. Since blood cells have extremely low conductivity as compared to the diluent in which they are diluted, each time a blood cell passed between the electrodes, the voltage between the electrodes would increase and provide a pulse output. When the pulses exceeded a predetermined threshold level, a blood cell was counted.

These counting devices suffered from two deficiencies. The devices using DC electronic sensing suffered from electrode instability. Base line instability occurred because of bubble formation resulting from sensitivity to polarization potentials. Thus, it was necessary to use electrodes formed of precious metal to prevent bubble formation. Another requirement of all prior art particle counters was the need for precise sample volume measurement. These devices were expensive and subject to errors because of the difficulty in making accurate volume measurements.

Another problem encountered by the aperture type systems of the prior art was the correction for blood cell coincidence. The devices of the prior art generated a single pulse output for every detected blood cell passing through the aperture. However, when blood cells passed through the aperture in total or partial coincidence, only a single pulse would result and one cell would be counted. In order to correct for this error, the devices of the prior art provided correction tables so that a count of the total output pulses could be converted to a more accurate count by the addition of a statistically determined number of cells. As can be seen, such a system is subject to errors and cannot be said to provide an actual count of the blood cells passing through the aperture.

Thus, the devices of the prior art required the use of correction tables and did not provide a direct reading of actual blood cell count. In addition, these devices were large and expensive, thereby making them impractical for use by individual doctors, veterinarians and small laboratories.

SUMMARY OF THE INVENTION

The present invention contemplates a particle counter that may also be used as a blood cell counter that provides practicing physicians, veterinarians and laboratories with a simple, reliable and accurate instrument for counting white and red blood cells. The instrument automates the tedious task of physically counting individual blood cells and uses automatic compensation devices to provide a quick and accurate blood count.

The operational concept of the counter is based upon the difference in characteristics between the particles to be counted and the fluid in which the particles are suspended. The fluid is drawn through a restricted flow path such as an aperture and the particles are sensed as they pass through the restricted flow path. Particle sensing is accomplished by sensing the different characteristic of the particles as they pass through the aperture. There are numerous sensors that may be used depending upon the characteristic to be sensed. When the particles have different light transmitting characteristics, photocells may be used to sense the particles. Other characteristics that may readily be sensed are capacitance and impedance. All sensors of this type provide signal outputs in the form of pulses having widths that correspond to the flow rate of the fluid through the restricted path or aperture.

When used as a blood cell counter, the device may depend upon the difference in conductivity between blood cells and the diluent used to prepare blood samples. The diluted blood sample is drawn through an aperture of known size so that as individual blood cells pass through the aperture, the impedance across the aperture abruptly increases. An AC signal is applied to a pair of electrodes positioned one on each side of the aperture so that the signal is modulated by the variation in impedance between the electrodes as blood cells pass through the aperture. The modulated AC signal is coupled to a signal detector where it is demodulated to provide pulses corresponding to the blood cells passing through the aperture. The high frequency component of the modulated signal is attenuated by passing the signal through a low-pass filter after which the pulses are amplified and shaped.

The device may also use photocells to detect blood cells passing through the restricted path or capacitance sensors to detect the passing blood cells. These sensors also provide a pulse for each sensed blood cell, the pulse width being a function of the time the cell is in the restricted path or of the fluid flow rate.

The pulse signals are connected to a gate and a threshold detector, the threshold detector senses pulses of a predetermined threshold level and in response thereto provides a signal to the gate for causing the gate to open and pass the pulses to a counting circuit.

The counting circuit includes means for accumulating or counting pulses received during a precisely repeatable count period and for providing an output indication corresponding to the number of blood cells per unit volume of sample passing through the aperture.

A vacuum pump and pressure regulator are utilized for drawing the blood sample through the aperture at a constant predetermined rate of flow. Since the aperture size, flow rate and count period are all known, predetermined and constant values, the blood volume is also constant and may be predetermined without the need for measuring the volume of blood that has passed through the aperture as required in the prior art.

The present invention provides several improvements over the prior art. The device has improved accuracy because it is easier to regulate flow rate and measure a precise count period using electronic circuitry than it is to directly measure a precise volume of blood sample by detecting the physical presence of blood. By the use of AC electronic sensing, many of the problems experienced by the prior art were eliminated. The tendency to develop polarization potentials was eliminated and less expensive electrodes could be used without the formation of bubbles. Thus, it is no longer necessary to use precious metal electrodes.

In a second embodiment of the present invention, the pulses are clipped at a predetermined level and are thereafter integrated for providing an analog signal corresponding to the number of pulses passing through the aperture. In this embodiment, it is not necessary that a pressure regulator be used nor that the flow rate remain constant since the integrating technique automatically compensates for reasonable variations in flow rate. The analog voltage output is provided to a meter which is directly calibrated in cells per cubic millimeter to provide the blood cell reading.

The second embodiment of the present invention has an additional advantage in that it inherently compensates for blood cells that pass through the aperture in partial coincidence. If two blood cells are partially coincident, one wide pulse is formed as they pass through the aperture. The wide pulse will charge the integrator for a longer period of time than normal pulses, thereby compensating for the partially coincident cells. Truly coincident cells will form a pulse having a normal pulse width and only one cell will be counted; however, the meter has a scale that is calibrated to compensate for the truly coincident cells on a statistical basis so that the number of cells read from the meter is equal to the number of cells actually passing through the aperture within specified tolerances.

The second embodiment of the present invention also provides blood flow rate independence. If the flow rate increases, the pulse width decreases, thereby charging the integrator a correspondingly shorter period of time for each cell; however, the number of cells passing through the aperture during the count period increases, resulting in substantially same analog voltage being developed by the integrator during the count period. Thus, the system is self-compensating for variations in flow rate. It is essential that the count period be precisely repeatable so that once the instrument is calibrated using a sample of known blood count, subsequent blood counts will be accurate despite variations in blood sample flow rate.

The invention also contemplates an on-line particle counter that provides a continuous output reading of the particle count of the particles being passed through the aperture at any given time. In such a device, the count period is not utilized but the integrating capacitor is provided with a discharge path for continuous controlled discharging of the capacitor so that the instantaneous voltage on the capacitor corresponds to the particle count of the sample passing through the aperture.

The main objective of the present invention is to provide a blood cell counter that is not dependent upon volume measurement.

Another objective of the present invention is to provide a blood cell counter that is less expensive than those heretofore provided so that it will be available for use in doctors' offices and in small laboratories.

Another objective of the present invention is to provide a blood cell counter that is of smaller size than those heretofore provided.

Another objective of the present invention is to provide a blood cell counter having automatic cell coincidence compensation.

Another objective of the present invention is to provide an aperture type blood cell counter that is not dependent upon flow rate of the sample through the aperture or the sample volume.

Another objective of the present invention is to provide an aperture type blood cell counter free of polarization potential problems.

Another objective of the present invention is to provide a blood cell counter utilizing an analog signal corresponding to the number of blood cell per cubic millimeter.

The foregoing objectives and advantages of the invention will appear more fully hereinafter from a consideration of the detailed description which follows, taken together with the accompanying drawings, wherein several embodiments of the invention are illustrated by way of example. It is to be expressly understood, however, that the drawings are for illustrative purposes only and are not to be considered as defining the limits of the invention.

DESCRIPTION OF THE DRAWINGS

FIG. 4 is a schematic block diagram showing a portion of a second embodiment of the present invention.

FIG. 5 shows a comparison of the pulse widths at two different flow rates.

FIG. 6 is a schematic block diagram showing a modification of the device illustrating another embodiment of the present invention.

FIG. 7 is a diagram illustrating another embodiment of the present invention.

DESCRIPTION OF THE INVENTION

The present invention pertains to devices for counting particles suspended in a fluid medium, wherein the medium and the particles have substantially different characteristics.

Figure 1:
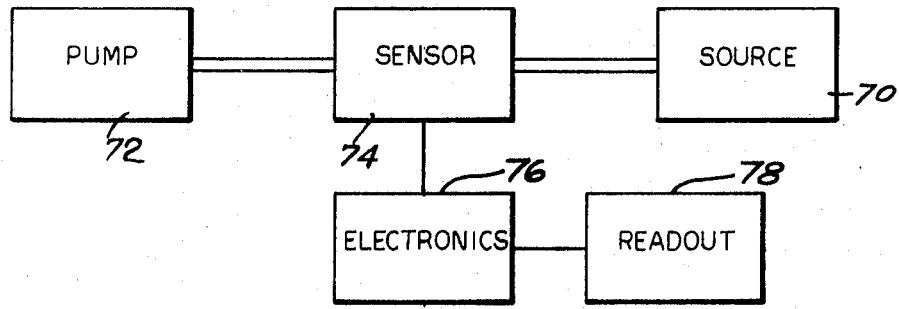
FIG. 1 is a block diagram of a particle counter.

Referring to FIG. 1, there is shown a basic block diagram of a particle counter. A source 70 provides a fluid in which the particles to be counted are disbursed. The particles have a detectable characteristic differing from the characteristics of the fluid. The different and detectable characteristic could be any of numerous characteristics such as impedance, resistance, capacitance, magnetism or transmittance. A pump 72 or similar devices is used to pass the fluid through a sensor 74. Sensor 74 includes a restricted path through which the fluid is passed and an appropriate sensing means for sensing the different and detectable characteristic of the particles as they pass through the aperture. The sensor also provides signals to electronic circuitry 76 in which the signals are accumulated and processed to provide an output signal to a readout device 78 which provides an indication of the particles per unit volume of the fluid.

The signals provided by the electronic circuitry are in the form of a pulse for each particle detected and the pulses have widths corresponding to the time during which the particle is being detected, this width also corresponds to the flow rate of the fluid through the restricted path.

The invention will be described as a blood cell counter wherein the higher impedance of blood cells is sensed; however, it is to be understood that the invention may be used for counting many types of particles such as dust, pollen or pollution and that many types of sensors could be used, including photocell sensors.

Figure 2:
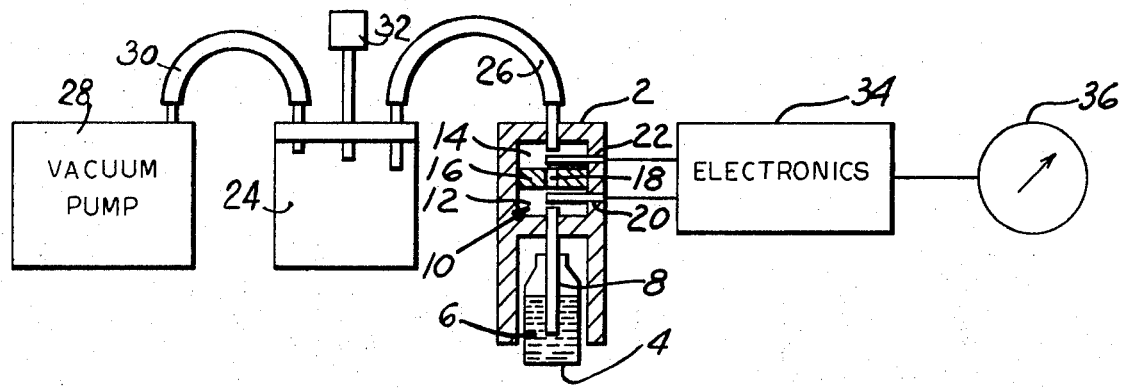
FIG. 2 is a diagram illustrating an embodiment of the present invention.

Referring to FIG. 2, there is shown a diagrammatic representation of the system of the present invention. An electrode housing 2 receives a container 4 containing a diluted blood sample 6. A dip tube 8 extends downwardly from the electrode housing into the blood sample 6 contained in container 4. A cavity 10 is formed in the upper portion of the electrode housing and is divided into first and second chambers 12 and 14 by a partition 16 having an aperture 18 formed therein for connecting the first and second chambers. Dip tube 8 extends into the first chamber 12 of cavity 10 for communicating container 4 with chamber 12. Aperture 18 has a diameter of 90 microns, a diameter that was chosen because of its relationship to the size of a normal red blood cell. Electrodes 20 and 22 are mounted in the electrode housing 2 and extend into the first and second chambers respectively. The electrode housing and the partition 16 are formed of nonconductive material so that the electrodes remain electrically isolated from each other and do not short out through the electrode housing.

A liquid trap 24 has a hollow interior which is in communication with the second chamber 14 through a flexible tube 26. A vacuum pump 28 is pneumatically connected with the interior of liquid trap 24 through a flexible tube 30 for evacuating the trap. A pressure regulator 32 is provided for regulating the pressure within the liquid trap.

The pressure within container 24 is maintained below atmospheric pressure so that the diluted blood sample 6 from the container 4 is drawn through dip tube 8 and into the first and second chambers 12 and 14 so as to establish a flow of blood sample through aperture 18.

Pressure regulator 32 maintains the pressure in liquid trap 24 within certain limits so that a constant rate of blood flow through the aperture is maintained.

Electronic circuitry 34 impresses an AC signal across the electrodes to develop a voltage across the electrodes dependent upon the instantaneous impedance of the diluted blood sample passing through the aperture.

Blood cells have substantially higher impedance than the diluent used in the sample and therefore, abrupt voltage increases or pulses are generated each time a blood cell passes through the aperture. The electronic 34 senses the pulses and processes them to provide an output corresponding to the number of blood cells per cubic millimeter of blood sample passing through the aperture. This output is displayed on a readout device 36, such as a meter.

Figure 3:
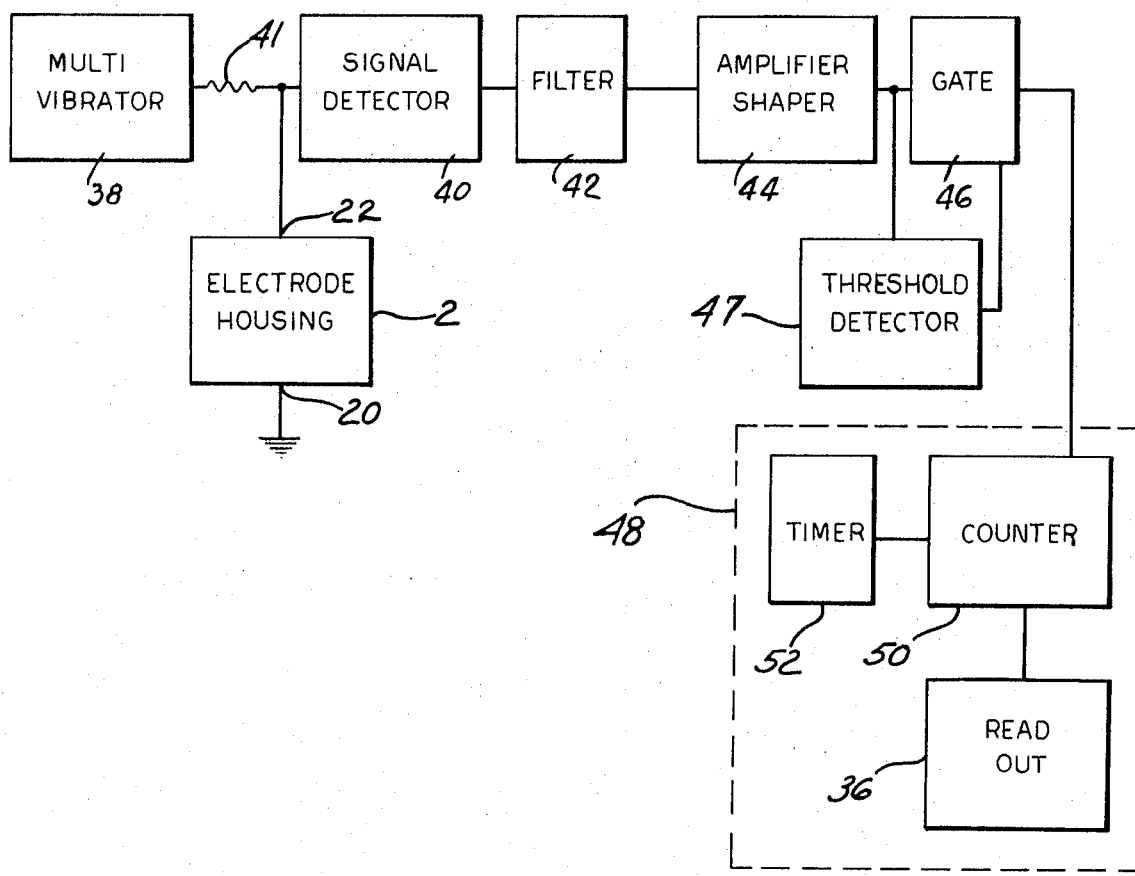
FIG. 3 is a schematic block diagram showing the electrical system of a first embodiment of the invention.

Referring to FIG. 3, there is shown a block diagram of the electronic circuitry utilized for the first embodiment of the present invention. A multivibrator 38 has an output that provides a squarewave r.f. signal at a frequency of 330 KHz with a 20 volt peak voltage. The output of the multivibrator 38 is connected to a signal detector 40 and to electrode 22 of the electrode housing 2 through a resistor 41. Electrode 20 of the electrode housing 2 is connected to ground so that resistor 41 and the impedance of the substance between the electrodes form a voltage divider.

As blood cells pass through aperture 18, the impedance between the electrodes increases causing an increase in voltage across the electrodes thereby modulating the r.f. signal provided to the signal detector. Signal detector 40 functions as a demodulator and amplifier for providing a rectified signal at an output which is connected to a low pass filter 42 which eliminates the r.f. component of the signal. Filter 42 is of a type that passes frequencies below 33 KHz; therefore, the filter has an output that provides a series of pulses corresponding to blood cells passing through the aperture.

The pulses from the filter are provided to an amplifier shaper 44 which merely amplifies the pulses which are then directed to a gate 46 and a threshold detector 47. The threshold detector senses the pulses and in response to pulses having a level exceeding a predetermined level provides an output signal to gate 46. Gate 46 in response to the output signal for the threshold detector either passes or blocks the pulses from the amplifier shaper 44.

Gate 46 has an output connected to a counter circuit 48, which includes a digital counter 50 and a digital readout 36. Counter 50 is controlled by a timer 52 which enables the counter and allows the counter to count for a predetermined period of time.

Timer 52 is preferably an electronic type of timer using a conventional R-C timing circuit and a programmable uni-junction transistor. This type of timing circuit provides extremely accurate and precisely repeatable count periods. Thus, the counter counts blood cells passing through the aperture during a precisely controlled count period of known duration during which time a known volume of blood sample passes through the aperture. Since both the area of the aperture and the velocity of the blood sample are known and constant, the volume of blood passing through the aperture is known and constant for every count period. The volume being equal to the area of the aperture times the velocity of the blood through the aperture times the duration of the count period.

Thus, the present invention eliminates the need for measuring a known volume of blood by sensing the physical blood. The present invention utilizes constant parameters in conjunction with an extremely accurate electronic timer to determine the volume of blood that has passed through the aperture.

In a modified embodiment of the invention, the requirement for a pressure regulator is eliminated and the counter becomes flow rate independent. Referring to FIG. 4, the counting circuitry 48 of FIG. 3 is shown in modified form. The output of gate 46 shown in FIG. 3 is connected to an input of a second gate 54, which is controlled by a timer 56, similar to timer 52, for passing electronic pulses corresponding to blood cells only during a precisely controlled count period. An output of gate 54 is connected to an input of a clipper or limiting circuit 58 which clips or limits all blood cell pulses to a predetermined level, the purpose of which will be discussed subsequently. An output of clipper circuit 58 is connected to an integrator 60 which is essentially an R-C integrating circuit for accumulating and storing charges provided by each of the blood cell pulses received from the clipper circuit. During the precisely controlled count period, the integrator circuit develops an analog voltage corresponding to the number of blood cells detected. The voltage developed by the integrator 60 is provided to a meter 36, which provides an indication at the end of the count period corresponding to the number of blood cells per cubic millimeter of diluted blood sample.

Upon initial calibration of meter 36, an assayed blood sample is passed through the blood cell counter and the meter reading is adjusted to the assay value. Thus, the meter is calibrated to a known blood count and will remain calibrated for subsequent blood counts of unknown value.

Through the unique use of the integrating technique, the blood cell counter is rendered truly volume and flow rate independent as illustrated in FIG. 5. Referring to FIG. 5A, there is shown a series of pulses resulting from blood cells passing through the aperture at a flow rate F1 between the time periods T1 and T2. In accordance with known principles, a capacitor may be charged with these pulses to a voltage corresponding to the total area under the curve as illustrated by the sectioned pulses. Referring now to FIG. 5B, there is shown a series of pulses corresponding to blood cells passing through the aperture at a flow rate F2 equal to twice the flow rate F1 during the period between time T1 and T2. It will be noted that the pulses have decreased in width to one-half the original width, but that twice the number of blood cells have passed through the aperture and thus, twice the number of pulses have been provided. It is clear that the area under the curve of FIG. 5B, is substantially equal to the area under the curve of FIG. 5A and that a capacitor would be charged to an equal voltage by the pulses of FIG. 5A and the pulses of FIG. 5B. Thus, the present invention provides a blood cell counter that is truly volume and flow rate independent.

Clipper 58 is utilized to prevent counting errors caused by variations in blood cell size. An abnormally large blood cell would produce a higher level pulse than would a smaller blood cell and as a result, would contribute an excessive charge to the integrating capacitor whereas a smaller blood cell would contribute only a small charge that would be insignificant in relation to the charge resulting from the large cell. By limiting the amplitude of all pulses, the larger and smaller cells tend to provide substantially equal charges to the integrating capacitor.

Another advantage of the present invention is that it provides automatic compensation for partial blood cell coincidence. In prior art, blood cell counters and in the first embodiment described, if two blood cells pass the aperture in partial coincidence, only one cell is counted because only one pulse of long duration is provided. However, by using the concept of integration when two pulses are in partial coincidence and an abnormally long pulse is provided, the capacitor is charged a correspondingly greater amount and is thereby automatically compensated for the partial coincidence of blood cells.

The present invention is adaptable for on-line operation for continuously monitoring the particle count of a flowing fluid medium. Such a device is particularly useful for pollution monitoring and control.

Referring to FIG. 6, there is shown a portion of the counting circuit 48 of FIG. 4 in modified form. Gate 54 and timer 56 have been eliminated while a controlled discharge path 61 is provided for discharging the integrator at a controlled rate. Discharge path 61 may be a resistor connected between the integrating capacitor and ground.

The integrating capacitor develops a voltage that is dependent upon the rate at which the capacitor is charged and this rate is dependent upon the number of pulses or particles counted.

Referring to FIG. 7, there is shown another embodiment of the present invention wherein a photocell is used to detect blood cells or particles. A transparent conduit 80 has a restricted flow path 82 through which the fluid is passed. A light source 84 directs a beam of light through the restricted path and the fluid and impinges on a photocell 86. As blood cells or particles pass through the restricted path photocell 86 senses a disturbance of the light beam and provides a pulsed output to electronic circuitry 88 similar to that previously described. Circuitry 88 provides a signal output to readout 90 for providing an indication of particles per unit volume of the fluid.

Thus, the present invention may be used for counting particles in individual fluid samples or for continuously monitoring particle count of a fluid in an on-line process.

The present invention provides an inexpensive blood cell counter having greater accuracy than those heretofore provided. The blood cell counter is considerably less expensive because it does not require the complicated and expensive components needed for the physical measurement of blood volume as in the prior art devices and in place thereof utilizes extremely accurate and dependable electronic timers. The invention also provides a counter that has automatic compensation for partial cell coincidence and is independent of blood flow rate. Thus, through the unique use of integrating techniques, the present invention provides a device that overcomes many of the problems associated with the prior art.

What is claimed is:

1. A method for counting the number of particles per unit volume suspended in a fluid, said particles having a detectable characteristic differing from the fluid, comprising the steps of:

passing the fluid through a sensing means;
sensing the detectable characteristic of the particles as the particles pass through the sensing means;
providing pulses responsive to the sensing of the detectable characteristic when a threshold level is exceeded, each said pulse having an amplitude limited to a specified level and a width related to the time during which the particle is being sensed; and
integrating the pulses over a fixed period of time to obtain a signal corresponding to the number of particles per unit volume of the fluid so that the signal is independent of flow rate and volume of fluid passed through the sensing means and substantially independent of particle size.

2. An instrument for counting the number of particles per unit volume suspended in a fluid, said particles having a detectable characteristic differing from the fluid, said instrument comprising:
   sensing means for sensing the detectable characteristic of the particles;
   means for passing the fluid through the sensing means, means connected to the sensing means responsive to the sensing of the detectable characteristic of the particles for providing pulses when a predetermined threshold level is exceeded, each of said pulses having an amplitude limited to a specified level and a width related to the time during which the particle is sensed; and,
   means for integrating the pulses over a fixed period of time to obtain a signal corresponding to the number of particles per unit volume of the fluid so that the signal is independent of flow rate and volume of fluid passed through the sensing means and substantially independent of particle size.

3. The device in accordance with claim 2 wherein the sensing means includes a transparent conduit and means for passing a light beam through said transparent conduit.

* * * * *